United States Patent [19]
Walton et al.

[11] Patent Number: 5,355,144
[45] Date of Patent: Oct. 11, 1994

[54] TRANSPARENT WINDOW ANTENNA

[75] Inventors: Eric K. Walton, Columbus, Ohio; Harry S. Koontz, Pittsburgh; Raymond D. Moran, Springdale, both of Pa.

[73] Assignee: The Ohio State University, Columbus, Ohio

[21] Appl. No.: 852,400

[22] Filed: Mar. 16, 1992

[51] Int. Cl.$^5$ .............................. H01Q 1/32
[52] U.S. Cl. .................. 343/713; 343/767; 343/769
[58] Field of Search ............... 343/711, 712, 713, 767, 343/769; H01Q 1/32

[56] References Cited

U.S. PATENT DOCUMENTS

| | | | |
|---|---|---|---|
| 2,971,191 | 2/1961 | Davis | 343/712 |
| 3,007,164 | 10/1961 | Davis | 343/712 |
| 4,086,595 | 4/1978 | Cherenko et al. | 343/713 |
| 4,707,700 | 11/1987 | Nagy | 343/712 |
| 4,721,963 | 1/1988 | Nagy et al. | 343/713 |
| 4,768,037 | 8/1988 | Inaba et al. | 343/713 |
| 4,849,766 | 7/1989 | Inaba et al. | 343/713 |
| 4,864,316 | 9/1989 | Kaoru et al. | 343/704 |
| 5,005,020 | 4/1991 | Ogawa et al. | 343/713 |
| 5,012,255 | 4/1991 | Becker | 343/767 |
| 5,124,714 | 6/1992 | Harada | 343/770 |

FOREIGN PATENT DOCUMENTS

| | | | |
|---|---|---|---|
| 0375415 | 6/1990 | European Pat. Off. | H01Q 1/32 |
| 0375416 | 6/1990 | European Pat. Off. | H01Q 1/32 |
| 15701 | of 1990 | Japan | |
| 113603 | of 1990 | Japan | |
| 0196704 | 8/1991 | Japan | H01Q 1/32 |
| 0204201 | 9/1991 | Japan | H01Q 1/32 |
| 0204202 | 9/1991 | Japan | H01Q 1/32 |

OTHER PUBLICATIONS

Louis L. Nagy, "A New Generation of Antennas for Automobile Use", SAE Technical Paper, 1987, reprint of SP-701-Recent Developments in Automotive Audio Systems.

Jorge Gualtieri, "A New Calss of Glass", Automotive Industries, Jan. 1992, p. 49.

Primary Examiner—Donald Hajec
Assistant Examiner—Tan Ho
Attorney, Agent, or Firm—Frank H. Foster

[57] ABSTRACT

A slot antenna formed in combination with a vehicle window. An electrically conducting, optically transparent film panel is bonded to the window and terminates so that its outer peripheral edge is spaced from the innermost edge of the metal framing the window to define a polygonal antenna slot between the edges. An unbalanced transmission line is connected to the antenna by connecting the grounded conductor to the framing metal near the metal edge and coupling the ungrounded conductor to the conductive panel near the juxtaposed, interfacing edge of the conductive panel.

12 Claims, 4 Drawing Sheets

TRANSPARENT WINDOW ANTENNA

TECHNICAL FIELD

This invention relates generally to a radio frequency antenna and more particularly relates to an antenna formed in association with the window of a vehicle for transmitting or receiving radio signals.

BACKGROUND ART

A variety of vehicles, such as automobiles and aircraft, carry electronic equipment which requires an antenna. Historically, antennas for vehicles consisted of structures which protruded from and were mounted to the outer surface of the body or skin of the vehicle. An example is the common automobile whip antenna. The prior art then came to recognize that such antennas created aerodynamic problems, were easily broken, were not aesthetically appealing, and required holes through the outer body or skin, thus interrupting the integrity of that outer body or skin of the vehicle.

Prior art workers have attempted to reduce these problems by constructing antennas which conform to the shape of the outer surface of the vehicle. For example, an antenna has been formed in an automobile windshield by embedding a pair of inverted L-shaped wires in between the two glass layers of the windshield. Such antennas consisted of a pair of parallel spaced wires extending upwardly from the bottom center of the windshield which then diverged in opposite directions along but spaced from the top of the windshield. The problem with these antennas is that they exhibited undesired directional patterns and were visible to the operator of the vehicle and consequently were aesthetically undesirable.

Another proposed solution was the formation of a conventional slot antenna within the car body, but concealed behind an electromagnetically transparent material, such as a synthetic resin. Such antennas are illustrated in U.S. Pat. No. 4,707,700 and SAE Technical Paper entitled "A New Generation Of Antennas For Automobile Use" by Louis L. Nagy, reprinted from SP-701, *Recent Developments In Automotive Audio Systems*, 1987.

Yet another approach was shown in U.S. Pat. Nos. 2,971,191 and 3,007,164 which utilized the entire window opening as an aperture antenna.

Thin metal films are currently used in windshields as a solar shield to filter or reflect infrared and ultraviolet radiation in order to minimize the solar heating of the cat's interior. They may also be attached to DC sources so that an electrical current resistively heats the film to defrost the window. A substantial body of prior art exists teaching the application of such films to windows and a substantial body teaching resistive heating. Representative patents include: U.S. Pat. Nos. 4,610,771; 4,782,216; 4,806,220; 4,898,790; and 5,012,255.

Several antennas have been proposed which use the concepts of a whip antenna or a dipole antenna and combine it with the concept of forming such an antenna in a vehicle window by thin films on or between the layers of the window. Antennas of a variety of shapes are formed on the surface of the windows and often are provided with auxiliary or supplemental antennas in an attempt to control the antenna pattern or gain. Diversity selection has previously been used for antennas.

For example, U.S. Pat. Nos. 4,768,037 and 4,849,766 illustrate a variety of different antenna shapes formed by a thin film upon a layer of a vehicle window. U.S. Pat. No. 4,864,316 and Japanese Kokai patent Hei 2[1990]-113603 illustrate other shapes formed in the window. Japanese Kokai patent Hei 2[1990]-15701 shows an antenna on a rear window. U.S. Pat. No. 5,005,020 shows a film antenna with a surrounding bus bar. Further improvements to these antennas are needed to obtain the performance necessary to gain broad commercial acceptance of antennas formed integrally with a window.

The principal problem in vehicle mounted antenna design is to obtain an antenna which not only has low loss and desirable impedance characteristics but sometimes also, very importantly, an azimuthally omnidirectional pattern so that it can receive or radiate a strong signal which is substantially insensitive to its direction with respect to the vehicle so that the signal strength will not vary appreciably as the vehicle is turned.

BRIEF DISCLOSURE OF INVENTION

The prior art has viewed and treated antennas formed on a vehicle window as simply dipole, whip or other conventional antennas of the type which are ordinarily supported in free space. They applied those antenna concepts to the concept of forming an antenna as a thin film on a windshield. The prior art thin films were viewed as a radiating body spaced from a metal ground surface, but spaced by glass rather than the earlier atmospheric spacing of a protruding antenna, such as a whip.

The present invention forms a slot antenna between the metal frame of a window and a conductive, optically transparent film panel which is bonded to the window and has an outer peripheral edge spaced from the inner metal edge of the window frame. This defines a polygonally shaped antenna slot between the peripheral, outer edge of the inner panel and the inner metal edge of the surrounding metal.

Azimuthally omnidirectional pattern improvement is accomplished by feeding the slot antenna by an unbalanced transmission line which is connected so that the grounded conductor of the transmission line is coupled to the antenna near the inner edge of the outer metal of the frame and so that the ungrounded conductor is coupled to the conductive inner, film panel near the oppositely facing peripheral edge of the conductive panel. Forming a slot antenna in this manner and connecting its transmission line feed conductors near opposing, interfacing edges of the slot substantially enhances the azimuthally omnidirectional character of the antenna's pattern. A slot antenna fed in this manner creates generally symmetrical current patterns in the conductor surfaces on opposite sides of the slot. These symmetrical current patterns set up a generally balanced field across the slot and thereby avoid much of the directional character of prior art antennas.

Preferably, the ungrounded conductor of the transmission line which feeds the antenna is capacitively coupled to the transparent, conductive, film panel on the window by means of a small, second metallic layer which has an area selected to produce a capacitive reactance matching the inductive reactance of the antenna to the transmission line by minimizing the net reactive component.

Furthermore, for an automobile windshield which has a generally horizontally extending hood beneath it, the FM pattern and transmission line losses are substantially improved by feeding the slot antenna from its central bottom portion.

The present invention takes advantage of the existing gaps or apertures which are already present in vehicles, or other structures, and utilizes existing windshield manufacturing technology which is conventionally used to fabricate windows from layers, plies, coatings and laminations.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or coupled or terms similar thereto are often used. They are not limited to direct connection but include connection through other circuit elements where such connection is recognized as being equivalent by those skilled in the art. Similarly, metal body parts of a vehicle are often connected together to function as a single metal sheet and therefore are referred to in the singular even though they may consist of several parts.

DETAILED DESCRIPTION

Figure 1:
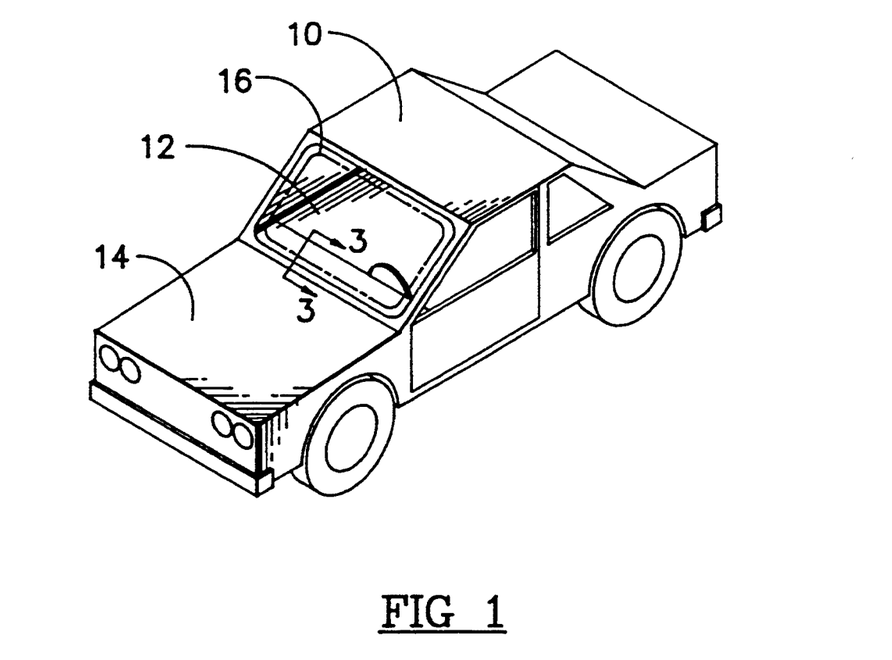
FIG. 1 is a view in perspective of an automobile having an antenna embodying the present invention.

FIG. 1 illustrates an automobile 10 having several windows, one of which is a windshield 12. Immediately below the windshield 12 is a conductive auto body panel 14, such as a hood, extending generally horizontally from below the window 12.

Figure 2:
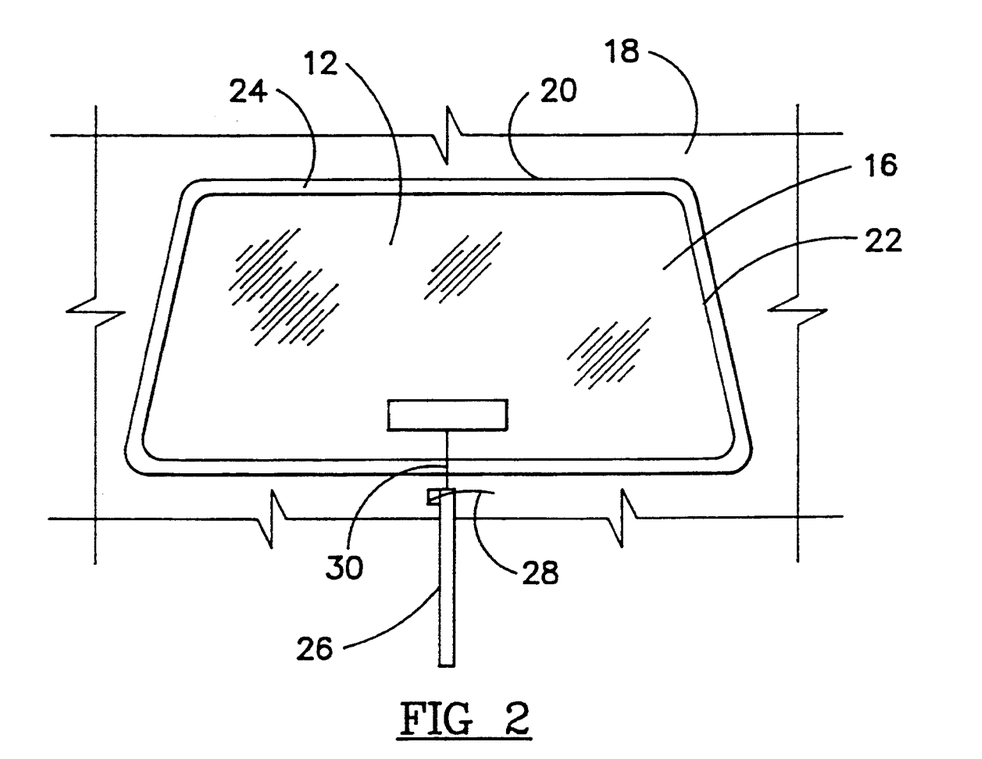
FIG. 2 is a diagrammatic plan view illustrating the detail of the antenna of FIG. 1.

The window 12 and its associated body structures are functionally illustrated in more detail in FIG. 2. The window is surrounded by a metal frame, which may be a separately identifiable bezel. The window appears electrically as a metal sheet 18 having an inner metal edge 20 defining an aperture. It is necessary that the metal sheet extend at least several inches away from its inner metal edge to provide a substantial conductive surface. The metal sheet cannot be only a narrow metal frame. The aperture is closed by a non-conductive, optically transparent window 12, typically of glass, extending across the aperture. An electrically conducting, optically transparent film panel 16 is bonded o to the window and has an outer peripheral film edge 22 which is spaced from the inner metal edge 20 to define a polygonal antenna slot 24 between the edge 20 and the film edge 22.

Metallized, thin film layers of this nature are currently incorporated into laminated automobile windshields for use as a solar shield to reduce the transmission of infrared and ultraviolet radiation through the window. For antenna purposes, the resistivity of the film is preferably on the order of 25 ohms per square or less. Antennas constructed with films having a resistivity of 8 ohms per square and 4 ohms per square respectively have been successfully tested. Films having a resistivity on the order of 100 ohms per square or more are believed to be less effective because they exhibit excessive resistive signal loss in the film. The glass or other glazing material, such as synthetic resins or plastics and any decorative border (not shown) about the window, of course, must be relatively non-conductive.

While the conductive, transparent panel on the window is typically a film, it can alternatively comprise a mesh or screen arrangement providing a continuous conduction path. For example, a mesh can be laminated to or molded within any of the window layers or plies.

The slot width must be sufficiently large that the capacitive effects across it at the frequencies of operation are negligible so that the signal is not shorted out. Although the capacitive reactance across the slot is less at the higher frequency FM broadcast band, the slot width is more critical in the lower frequency AM broadcast band. This is because, although the shunting reactance is greater at the lower frequency AM band, the antenna impedance is also considerably greater in the AM band and therefore the effect of the capacitive reactance in shunting the AM signal is greater in the AM band than its effect in shunting the FM signal. Antennas which have been constructed in accordance with the invention have been found to exhibit approximately a 50 ohm impedance in the FM band and approximately a 2000 ohm impedance in the AM band.

Experiments indicate that the outer peripheral edge of the film of the transparent panel should be spaced from the inner metal edge of the surrounding body metal to form a slot width greater than ¼ inch. At ¼ inch the antenna was found to work poorly. A ½ inch spacing was found to work well, but a one inch slot width provided even better performance. Slot widths greater than one inch produced no significant improvement.

The antenna is fed by an unbalanced transmission line, such as a coaxial cable or a strip line. It is very much preferred that the unbalanced transmission line conductors be coupled to juxtaposed, interfacing sides of the slot. While they do not need to be connected at the very edge of the slot, they must be connected within a few inches of the edge, preferably within about an inch, and at locations across the slot from each other. The grounded conductor, such as the outer shield portion of a coaxial cable, is coupled to the surrounding metal sheet, such as the car body or window frame, near the inner metal edge of the slot. The ungrounded conductor, such as the central conductor of a coaxial cable, is coupled to the conductive film near the oppositely facing peripheral edge of the film. This connection is highly desirable to improve the effectiveness of the antenna because it provides essentially symmetrical, electrical currents in the metal surfaces on opposite sides of the slot to provide a balanced field across the slot. This avoids asymmetrical currents and asymmetrical fields which would distort the pattern from its nearly uniformly omnidirectional pattern and cause nulls in some directions.

Consequently, it has been found that an antenna is not as effective if it is fed in the conventional manner which consists of simply connecting the grounded conductor of the unbalanced transmission line to any convenient grounding terminal. Rather, the transmission line conductors should be connected near the slot edge, and preferably within approximately one inch. A coaxial transmission line with a 120 ohm characteristic impedance was selected and found effective for feeding the antenna. Its impedance represents a compromise between the 50 ohm impedance exhibited at FM frequencies and the 2000 ohms exhibited at AM frequencies.

Most preferably, the transmission line is connected to the central lowermost portion of the slot, as illustrated in FIG. 2, in which the outer conductor 26 of the coaxial cable is connected to a connection point 28 of the metal frame near the center bottom of the windshield 12 and the central ungrounded conductor 30 is connected to the conductive, film panel 16 across the slot from the connection 28 of the grounded conductor 26.

Figure 7:
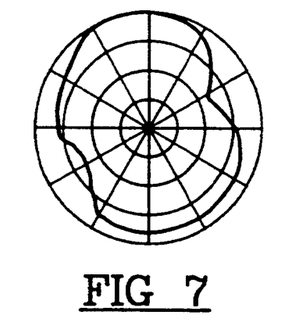
FIGS. 7 and 8 are polar plots illustrating the directional patterns for a top fed and bottom fed embodiment of the present invention on an automobile.
Figure 8:
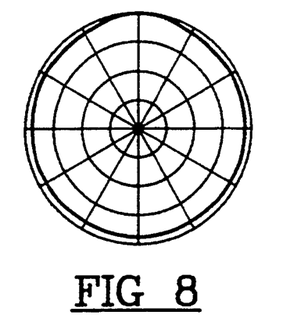

FIGS. 7 and 8 illustrate the significance of this connection to the central lowermost portion of the slot. FIGS. 7 and 8 are polar plots showing the amplitude of the received signal as a function of the direction of arrival of the signal with respect to the front of the automobile. In these plots, the radius is proportional to the signal power, with each circle representing a 10 dB change. The outer circle represents −50 dB in FIG. 7 and −47 dB in FIG. 8. The circular axis represents the 360° divisions of direction with respect to the vehicle front. Both plots were for a signal at 102 MHz.

FIG. 7 illustrates the antenna pattern when the antenna is fed from the top center. The pattern exhibits noticeable dips or nulls, in some directions, as large as 16 dB. FIG. 8 illustrates the same antenna fed from the central lowermost portion of the slot. It exhibits an azimuthally omnidirectional behavior with a signal variation no greater than 3 dB. Consequently, the antenna of the present invention fed in the manner and at the location preferred, provides little signal variation as the orientation of the vehicle to a transmitter or receiver is changed.

Tests have shown that in the FM broadcast band this embodiment of the invention provides a signal which is, on average, only 3–6 dB below that for a typical whip antenna. This variation in FM signal level is easily accommodated by the automatic volume control circuitry of the typical radio receiver. Furthermore, since it was found that approximately 3 dB of the signal loss was due to the resistive loss in the metal film, 3 dB of these reported losses do not represent degradation in the signal-to-external noise ratio. Thus, no significant degradation in the quality of the FM signal was observed.

In the AM broadcast band, the average signal levels were actually stronger than those due to a typical whip antenna.

The connection points are important because substantial distributed RF currents flow in both the transparent, electrically conducting panel and the surrounding metal sheet fed by the transmission line. If the connection points are moved, the impedance, efficiency and pattern change and degrade the antenna performance.

The principles of prior art diversity antenna systems can be applied to the present invention by providing multiple transmission line feed connection locations for embodiments of the invention. This takes advantage of changes in antenna characteristics which occur as a result of feed position. In a diversity system all the feed locations are periodically, electronically sampled and the location providing the strongest signal is connected to the receiver.

It is relatively easy and convenient to mechanically, conductively connect the outer shielded conductor of the coaxial transmission line to the metal surrounding the window using conventional terminals and fasteners. It is considerably more difficult, however, to conductively connect the central ungrounded conductor of the transmission line to a thin metal film.

It is preferred to capacitively couple the ungrounded conductor to the transparent film by means of a generally parallel, metallic layer which is spaced from the conductive film panel by an interposed, dielectric layer. This allows the central ungrounded conductor to be conductively and mechanically connected to the more robust parallel metallic layer. Two examples of this coupling are illustrated in FIGS. 3 and 4.

Figure 3:
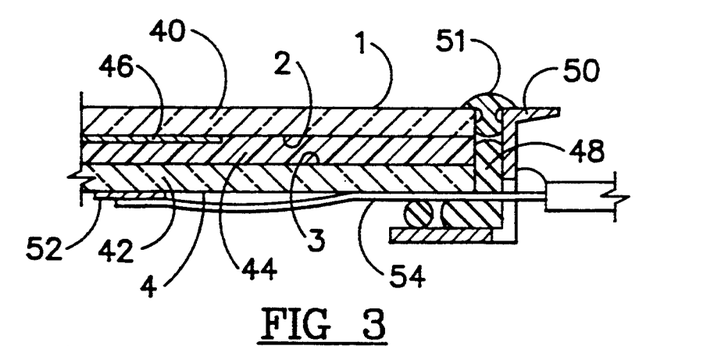
FIGS. 3–6 are views in cross-section of an edge portion of a windshield embodying an antenna in accordance with the present invention and illustrating alternative structures for coupling the antenna to the ungrounded conductor of the unbalanced transmission line which is connected to the antenna.

FIG. 3 illustrates a windshield comprising outer and inner glass plies 40 and 42, respectively, having a central, thermoplastic interlayer 44, typically polyvinylbutyral, to provide the conventional, laminated safety glass feature and also has a conductive metal film layer 46. Although not limiting in the present invention, the films may be of the types disclosed in U.S. Pat. Nos. 4,610,771; 4,806,220; 4,898,790; and 5,028,759, which teachings are herein incorporated by reference. These layers are shown at a disproportionate thickness in order that they will be visible in the drawings. The exterior glass ply 40 has an exposed surface 1 and an inner surface 2, while the interior glass ply 42 has an inner surface 3 and an exposed surface 4. Although not limiting in the present invention, in the embodiment shown in FIG. 3, the metallized layer 46 is coated on the surface 2 in any convenient manner known in the art, e.g. pyrolytic or C magnetic sputtering vacuum deposition, then covered with the interlayer 44 and sandwiched between the glass plies 40 and 42. The assembly is then laminated to form a unitary structure in a manner well known in the art. The coating layer 46 terminates before it reaches the outer peripheral edge of the glass plies 40 and 42. The laminated windshield is secured to the window frame 50 in any convenient manner, e.g. with adhesive 48. A molding strip 51 covers the space between the edge of the windshield and the frame 50. In the embodiment of FIG. 3, a conductive layer 52, such as an adhesive copper or other metal tape, a silver ceramic, conductive adhesive, etc., is bonded to an interior surface of the windshield, such as interior surface 4, and separated by the dielectric glass ply 40 and interlayer 44 from the metal film 46. The central, ungrounded conductor 54 is connected to the metal layer 52 in a conventional manner, such as by conductive adhesive.

Figure 4:
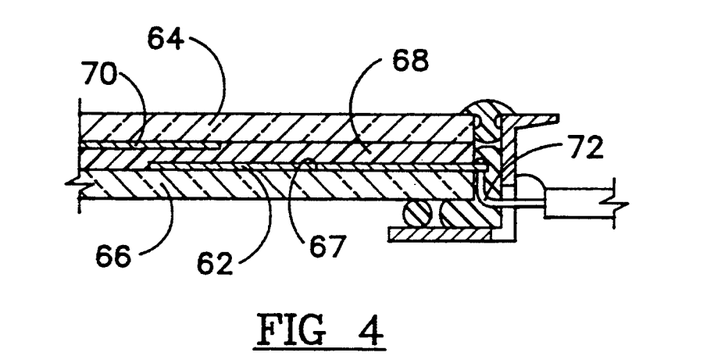

FIG. 4 illustrates an alternative embodiment in which the metal layer 62 is incorporated between the glass plies 64 and 66. The metal layer 62 is bonded to the interior surface 67 of inner glass ply 66 so that the interlayer 68 forms the dielectric separating the metal layer 62 from the conductive film panel 70. The central, ungrounded conductor 72 is connected conductively to the metal layer 62 in a conventional manner. Preferably the metal layer 62 has a leg which extends beyond the edge of the glass ply 66 to provide a connection tab or terminal.

Figure 5:
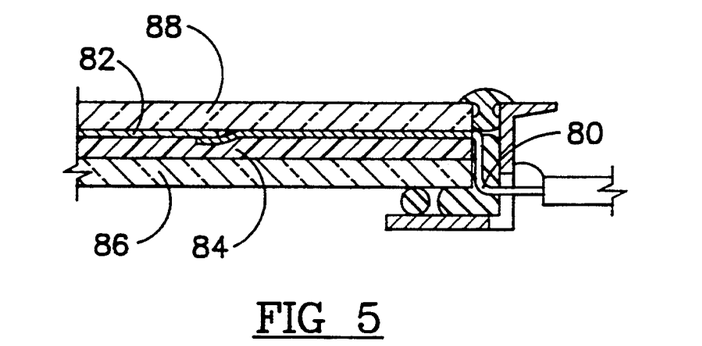

FIG. 5 illustrates yet another alternative embodiment in which the central conductor 80 is directly conductively connected to the conductive film panel 82, which is laminated with the interlayer 84 between a pair of glass plies 86 and 88. The conductor 80 may be a wire member, a metal tab or a thin silver-containing coating laminated within the windshield assembly.

Figure 6:
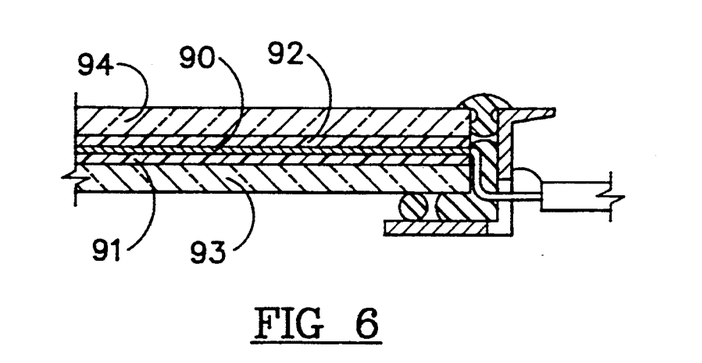

FIG. 6 illustrates a conductive panel 90 deposited upon a relatively thin interlayer sheet 91 with a second interlayer sheet 92 bonded to the conductive panel to form a three layer, flexible laminate. This laminate is then assembled between two glass plies 93 and 94 as the interlayer in the conventional manner. It should be appreciated that although FIG. 6 illustrates a direct electrical connection, a capacitive connection of the type illustrated in FIGS. 3 and 4 may also be used.

The capacitive coupling not only provides an easily and inexpensively manufactured electrical connection to the central conductive film panel, but additionally has been found to afford an opportunity for impedance matching the antenna to the transmission line. The slot antenna in accordance with the present invention was found to have a reactive component which is inductive. Consequently, since the capacitance between the metal layer, to which the ungrounded transmission line conductor line is connected, and the metal film 46 is a well known function of their interfacing areas, the distance between them, and the dielectric constant of the material, the interfacing area can be selected by design to match the antenna to the transmission line and thus minimize the net reactive component seen by the transmission line and thereby maximize RF energy transfer. The capacitive coupling also provides DC isolation from any resistive heating circuitry. When the conductive layer used for the capacitive coupling is between the glass layers, it is more protected from mechanical destruction or gradual environmentally caused deterioration. If the direct hard wire conductive connection is used, it may be desirable to interpose a capacitive element between the antenna and the transmission line in order to accomplish some impedance matching in the absence of capacitive coupling.

Connection of the transmission line to the bottom central portion of the windshield provides an additional advantage beyond improvement of the antenna pattern. Such connection requires a shorter cable because in most automobiles the radio is in the center of the dashboard immediately below the windshield. The shorter cable is an advantage because at AM frequencies a coaxial cable does not behave as a transmission line because of the long wavelength, but rather appears simply as a distributed capacitance shunting the signal. The shorter the cable the less the shunting capacitance and thus the less signal loss.

Experimentally, an embodiment similar to that illustrated in FIG. 3 was constructed and tested, utilizing a metal layer 52 which was 14.5 cm long and 1.2 cm wide and was found to work well. It is believed that the optimum capacitance area for an embodiment of the type illustrated in FIG. 4 would be an interfacing area of the metal layer 62 on the order of one to ten square centimeters. The necessary area for that embodiment is considerably smaller because the interlayer 68 is considerably thinner than a glass ply. Of course, as would be apparent to those skilled in the art, the interfacing area, and consequently the value of capacitance which would cause the capacitive reactance to nearly match the inductive reactance of the antenna, would be a function of the intended operating frequency and the size and shape of the vehicle and its windshield.

It is possible with existing windshields having a metal film solar barrier layer to additionally connect an electrical potential across opposite ends of the metal layer in order to provide a distributed current flow through the layer and resistively heat it, as shown in U.S. Pat. No. 4,820,902. This provides for window defrosting and deicing. Experiments have shown that this causes a significant deterioration of the radio frequency signals, but this may be overcome by conventional means, for example by providing a suitable RF choke in the power feed lines. At FM broadcast band frequencies, the shunting effect of such a power connection can be substantially minimized by selecting the position of the connection of the conductors across the slot so that they are connected at a pair of the RF voltage nodes which are spaced along the slot.

For the center, bottom connected antenna, it was found that there are two RF voltage nodes spaced along the slot at opposite sides of the window. By connecting the heater power conductors at the location of these RF voltage nodes, these conductors do not disturb the RF currents flowing in the metal layers around the slot and thus do not significantly disturb the pattern or the gain of the antenna.

Figure 11:
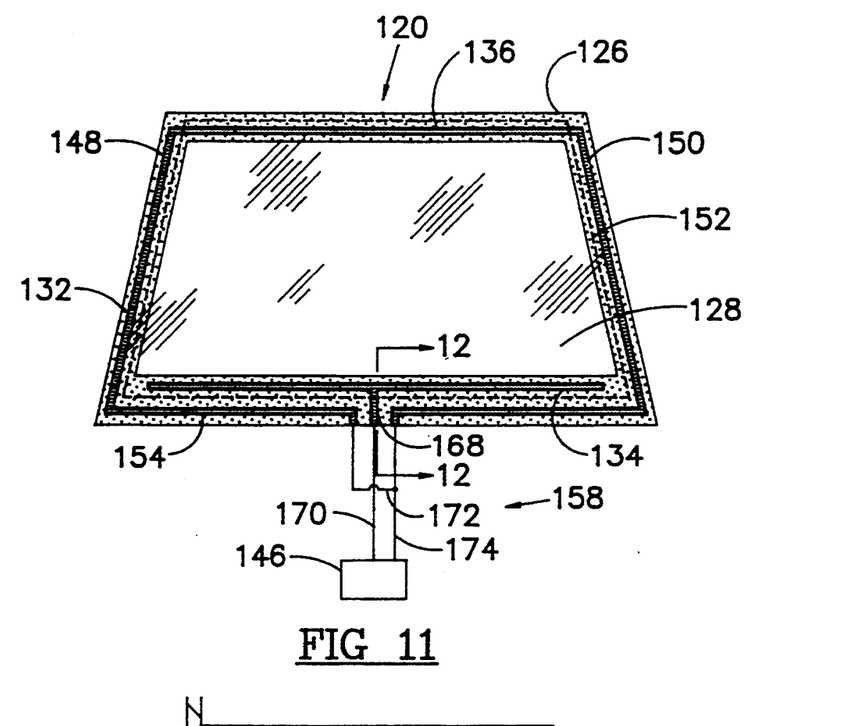
FIG. 11 is a plan view of an electrically heatable window or transparency incorporating the novel features of the windshield antenna of the present invention, with portions removed for clarity.
Figure 12:
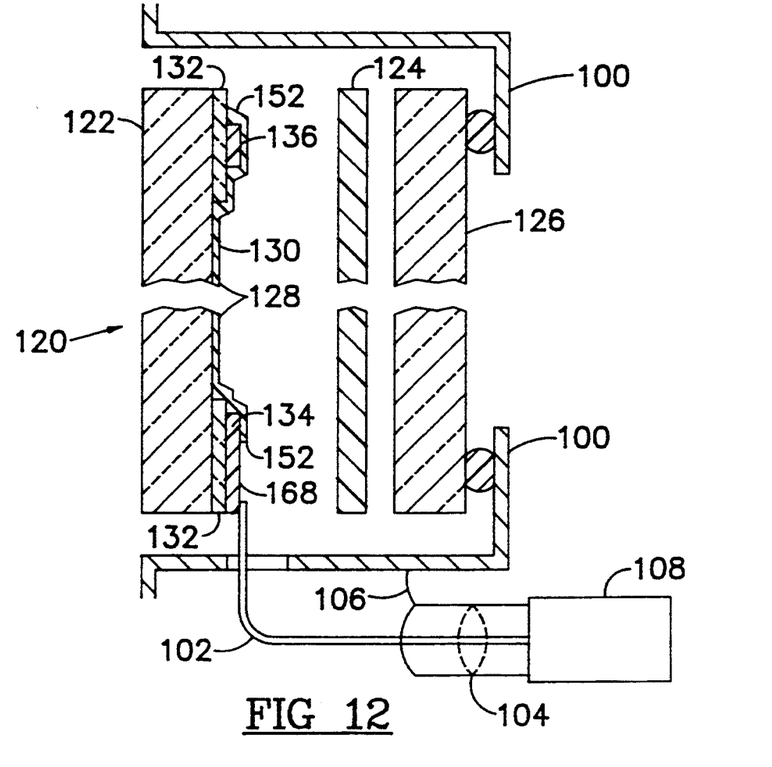
FIG. 12 is an exploded, sectional view taken along line 12—12 of FIG. 11 illustrating the electrical connection of a lower bus bar to the power source of the heatable transparency and the connections to the lower bus bar and vehicle frame for the radio antenna of the present invention.

As an example of an embodiment showing a heated windshield FIGS. 11 and 12 show a transparency 120 which includes an outboard glass ply 122, a plastic interlayer 124 (shown only in FIG. 12) and an inboard glass ply 126 (shown only in FIG. 12). The transparency 120 is positioned on frame 100 of a vehicle. An electroconductive coating 128 is placed preferably on the inboard surface 130 of the outboard glass ply 122. Although not limited in the present invention, in the particular embodiment of the invention illustrated in FIGS. 11 and 12, power is provided to the coating 128 via a bus bar and lead arrangement similar to that disclosed in U.S. Pat. No. 4,820,902. A bottom bus bar 134 and top bus bar 136 are positioned along opposing edge of the glass ply 122 with the coating 128 making electrical contact with the bus bars as shown in FIG. 12. The bus bar material is preferably a silver-containing ceramic material.

Electrical connection from a power source 146 to the top bus bar 136 includes leads 148 and 150 which extend from a terminal area 158 (shown only in FIG. 11) in opposite directions along the bottom edge of the transparency 120 from a terminal area 158 (shown only in FIG. 11) and along opposite side portions of the transparency 120 to opposite ends of bus bar 136. Electrical connection to the bottom bus bar 134 may be made via lead 168. The leads 148 and 150 are electrically insulated from the coating 128 and bottom bus bar 134 in any convenient manner, such as, for example, by limiting the coating 128 on surface 130 to that area of the glass ply 122 within a boundary area 152. Electrical lead 170 connects the bottom bus bar lead 168 to one pole of the electrical power source 146 and leads 148 and 150 leading to the bus bar 136 may be wired in common to the opposite pole, for example, by means of a jumper wire 172 and lead 174.

If desired, an opaque border 132, such as but not limited to a ceramic enamel, may extend about the marginal edge of the transparency 120 to conceal the bus bars 134 and 136 and leads 148, 150 and 168 of the heating circuit when the transparency 120 is viewed from outside the vehicle in which it is installed, through glass ply 122.

Although not limiting in the present invention, in the particular embodiment illustrated in FIGS. 11 and 12, the central conductor 102 of coaxial cable 104, i.e. the ungrounded conductor, is electrically connected to the film 128 via lead 168. However, it should be appreciated that rather than having a direct electrical connection to the film 128, a capacitive connection similar to that discussed earlier may be used. The outer shield portion 106 of the coaxial cable 104, i.e. the grounded conductor, is connected to the frame 100 in close proximity to the ungrounded connection. The cable is electrically connected to the radio 108.

In order to prevent the power source 146 from grounding the radio signal received via bus bar 138, the power source 46 preferably has a high impedance to RF signals. Although not limiting in the present invention, in one particular embodiment, this is accomplished by providing an induction coil in series with the power source 146.

Figure 10:
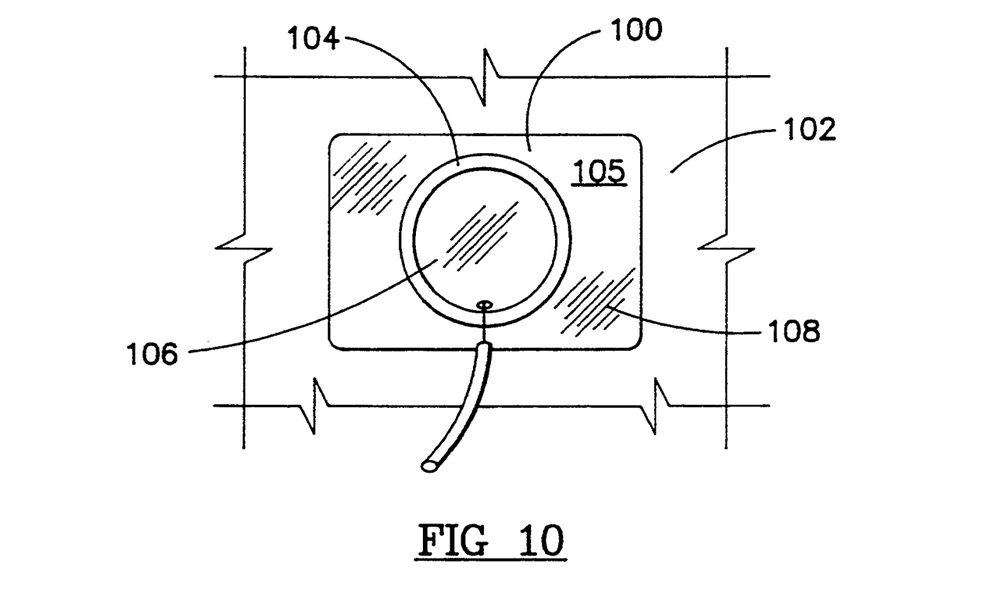
FIG. 10 is a plan view of an alternative slot antenna embodying the invention.

FIG. 10 illustrates that a slot antenna may be formed in a vehicle window using a metal film layer by forming the entirety of the slot in the metal film rather than between the outer peripheral border of the metal film and the inner edge of the window frame. FIG. 10 illustrates a transparent window 100 closing a metal body panel 102 and having a circular gap 104 in the metal film layer. The gap 104 forms a slot which is essentially a continuous, polygonal, nonconducting slot within the area of the film 105 to define an interior conductive polygonal panel 106 spaced from a surrounding exterior conductive sheet 108. Although not limiting in the present invention, FIG. 10 is a circle but it should be appreciated that other shapes are contemplated. The circle, as shown in FIG. 10, is a special polygon, which consists of an infinite number of sides, arranged symmetrically about a central axis. It may, for example, have a diameter on the order of 4 inches which would be appropriate for cellular telephones.

Antennas embodying the present invention may be used on all varieties of vehicles and other structures having windows, such as buildings. They can also be used on the side and rear windows of vehicles.

Figure 9:
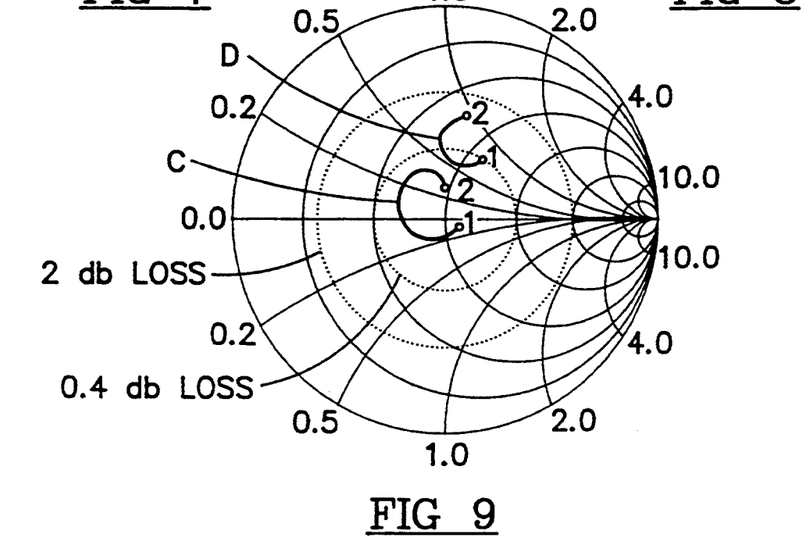
FIG. 9 is a Smith chart with two curves illustrating the operation of the present invention in the FM broadcast band without and with, respectively, capacitive coupling impedance compensation.

FIG. 9 is a Smith chart having two curves C and D indicating the impedance characteristic of the antenna over the FM band for the embodiments illustrated in FIGS. 3 and 5 and normalized to 50 Ohms. Points 1 and 2 represent frequencies of 88 MHz and 107.9 MHz respectively. Curve D illustrates the antenna itself with direct electrical connection to the film. Curve C illustrates the antenna combined with capacitive coupling for impedance matching purposes, as described above. In the case of the direct connection to the antenna in curve D, the Smith chart illustrates the inductive nature of the reactive component of the antenna impedance and shows a voltage standing wave ratio near 2:1. In the case of the antenna with capacitive coupling to the film and impedance matching in curve C, it shows a more nearly resistive impedance and a voltage standing wave ratio less than 1.5:1.

While certain preferred embodiments of the present invention have been disclosed in detail, it is to be understood that various modifications may be adopted without departing from the spirit of the invention or scope of the following claims.

We claim:

1. A slot antenna formed in association with a metal sheet having an inner metal edge defining an aperture which is closed by a non-conductive, optically transparent window extending across the aperture, the antenna including:
   (a) an electrically conducting, optically transparent panel bonded to the window and having an outer peripheral edge spaced from said inner metal edge to define a polygonal antenna slot between the edges;
   (b) an unbalanced transmission line having a grounded conductor and an ungrounded conductor coupled respectively to interfacing sides of the slot, the grounded conductor being coupled to the metal sheet near said inner metal edge; and
   (c) a coupling metallic layer, generally parallel to and spaced from the electrically conducting, transparent panel by an interposed dielectric layer and positioned near the oppositely facing peripheral edge of the conducting, transparent panel across the slot from the grounded conductor, the coupling metallic layer having an area interfacing the transparent conducting layer selected to provide a capacitance between the coupling metallic layer and the transparent conducting layer which impedance matches the slot antenna to the transmission line by minimizing net reactance, the ungrounded transmission line conductor being connected to the coupling metallic layer to capacitively couple the ungrounded conductor to the transparent conducting panel.

2. An antenna in accordance with claim 1 wherein the window comprises an interlayer laminated between two glazing plies, wherein the transparent, conductive film panel is laminated between the interlayer and one glazing ply and the coupling metallic layer is laminated between the interlayer and the other glazing ply.

3. An antenna in accordance with claim 1 wherein the coupling metallic layer is bonded to an exposed surface of one of the glazing plies and the conductive film panel is between the glazing plies.

4. An antenna in accordance with claim 1 wherein a resistance heating power source is connected to the conductive panel by means of conductors extending across the slot at a pair of RF voltage nodes spaced along the slot.

5. An antenna in accordance with claim 4 further including a first bus bar in contact with the film panel along a first edge portion of the window, a second bus bar in contact with the film panel along a second edge portion of the window opposite the first edge portion and means to provide connection of the bus bars to a power source.

6. An antenna in accordance with claim 5 wherein the connection means includes a first bus bar extension extending from the first bus bar to a terminal area along the first edge portion and a second bus bar extension extending from each end of the second bus bar to the first edge portion along third and fourth edge portions, respectively, and further extending along at least a portion of the first edge portion to the terminal area, the second bus bar extensions being electrically insulated from the first bus bar and film panel.

7. An antenna in accordance with claim 1 wherein a resistance heating power source is connected to the conductive panel by means of conductors extending across the slot at an RF node.

8. A slot antenna formed in association with a metal sheet having an aperture defined by an inner metal edge of the sheet, the aperture being closed by a non-conductive, optically transparent window which is angularly offset from a horizontal plane and extends from an adjacent, conductive, approximately horizontal vehicle body panel, the antenna including:

(a) an electrically conducting, optically transparent panel bonded to the window and having outer peripheral edges spaced from said inner metal edge to define a polygonal antenna slot between the inner metal edge and the peripheral edges, the slot being angularly offset from a horizontal plane to extend generally at an angle from the adjacent horizontal body panel at a slot edge; and (b) an unbalanced transmission line having an ungrounded conductor and a grounded conductor coupled respectively to interfacing sides of the slot near oppositely facing edge locations spaced across the slot from each other, the edge locations being at a central, lowermost portion of the slot, the grounded conductor being coupled to the metal sheet near said inner metal edge and the ungrounded conductor being coupled to the transparent conducting panel near a peripheral edge of the transparent conducting panel.

9. An antenna in accordance with claim 8 for use in the AM and FM broadcast bands wherein the width of the slot is greater than one quarter inch and not significantly greater than substantially one inch.

10. An antenna in accordance with claim 9 wherein the slot width is approximately one inch.

11. An antenna in accordance with claim 8 wherein said transparent conductive panel is laminated between two layers of an interlayer film to form a composite interlayer and wherein the interlayer is laminated between two glass plies.

12. An antenna in accordance with claim 8 wherein the conductive body panel extends generally horizontally from said lowermost edge of the window.

* * * * *

UNITED STATES PATENT AND TRADEMARK OFFICE
CERTIFICATE OF CORRECTION

PATENT NO. : 5,355,144
DATED : October 11, 1994
INVENTOR(S) : Eric K. Walton, et. al.

It is certified that error appears in the above-indentified patent and that said Letters Patent is hereby corrected as shown below:

Column 1, line 51, change "cat's" to --car's--.
Column 4, line 7, after "bonded" delete "o".
Column 6, line 46, after "or" delete "C"--.
Column 10, claim 2, line 3, change "piles" to --plies--.

Signed and Sealed this

Seventh Day of March, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,355,144
DATED : October 11, 1994
INVENTOR(S) : Eric K. Walton et al.

It is certified that error appears in the above-indentified patent and that said Letters Patent is hereby corrected as shown below:

On the title page, item [73], add --PPG Industries, Inc., Pittsburgh, Pennsylvania--.

Signed and Sealed this

Eighteenth Day of April, 1995

*Attest:*

BRUCE LEHMAN

*Commissioner of Patents and Trademarks*

*Attesting Officer*